Jan. 2, 1968     D. J. ASHCROFT ET AL     3,361,639

NUCLEAR REACTOR GRID STRUCTURE

Filed July 21, 1966     4 Sheets-Sheet 1

Patented Jan. 2, 1968

3,361,639
NUCLEAR REACTOR GRID STRUCTURE
David John Ashcroft, Bolton, and Arthur Edwards Timbs, Flixton, England, assignors to United Kingdom Atomic Energy Authority, London, England
Filed July 21, 1966, Ser. No. 566,932
Claims priority, application Great Britain, Aug. 10, 1965, 34,251/65
11 Claims. (Cl. 176—68)

ABSTRACT OF THE DISCLOSURE

A grid structure for a nuclear reactor fuel assembly containing a parallel array of fuel and poison pins comprises a spacer plate with oversized apertures for penetration by the pins, and resilient inserts each captive in a corresponding aperture and extending inwardly to provide at least three circumferentially spaced contacts for locating a pin centrally in the aperture with clearance between the pin and the bounding wall of the aperture to allow for flow of coolant over the pins. The inserts are permitted limited axial movement, and are located in the aperture either by tabs above and below the plate or by annular recesses in the bounding walls of the apertures. The recesses can be formed by laminations of the spacer plate.

---

The present invention relates to grid structures for nuclear reactor fuel assemblies.

A nuclear reactor fuel assembly customarily has a number of fuel elements or pins arranged in spaced array with their longitudinal axes parallel. The pins are usually supported at one end of the assembly and spaced apart at intervals along their length by spacer grids. Previously proposed spacer grids have been of cellular form, penetrated by the fuel pins and made of resilient strips and/or wires joined together to form the cells.

According to the present invention a grid structure for a nuclear reactor fuel assembly has a spacer plate with resilient inserts captive in apertures in the spacer plate, the resilient inserts being such as to locate fuel pins to be passed through the apertures.

Figure 1A:
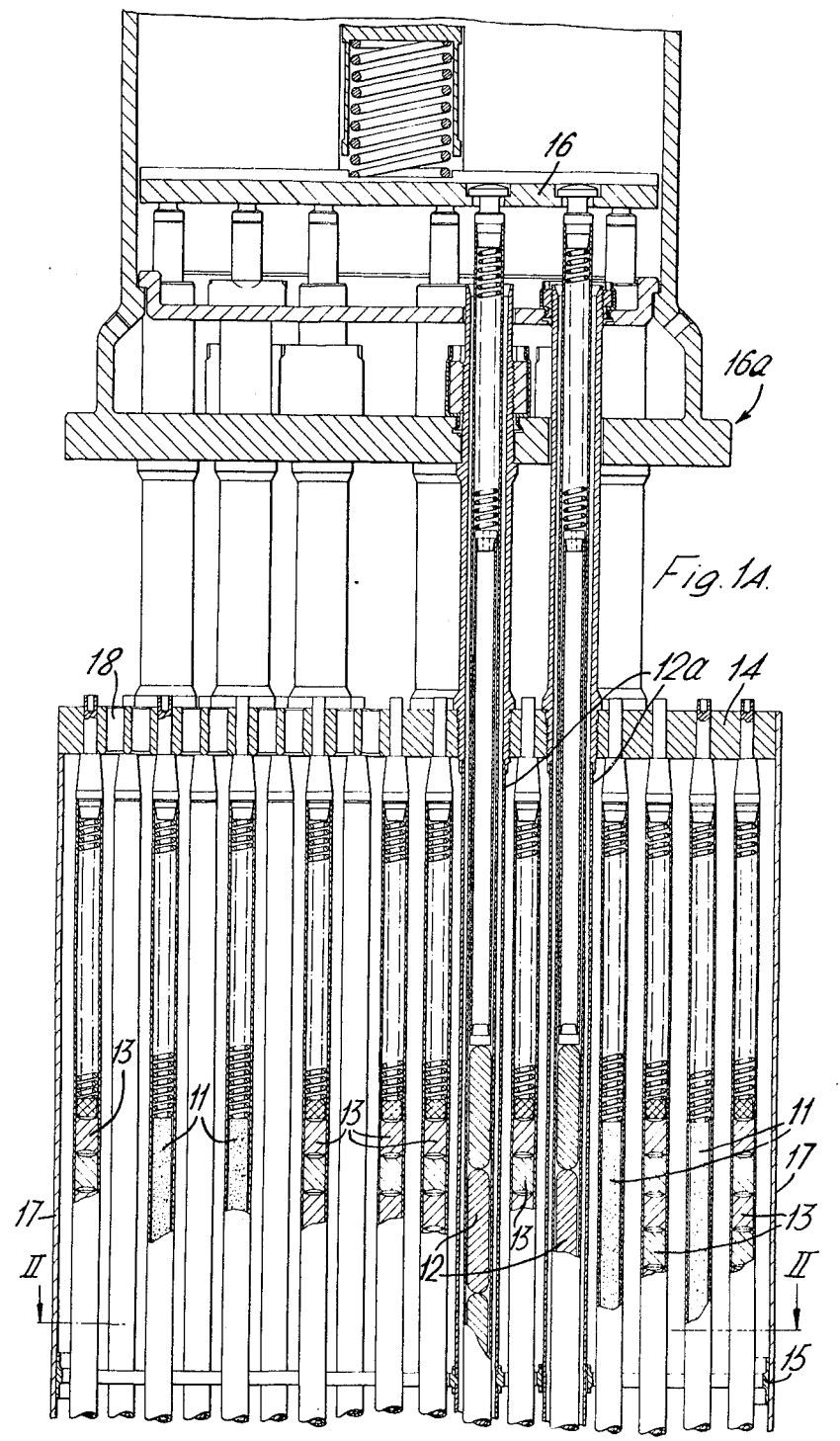
Figure 1B:
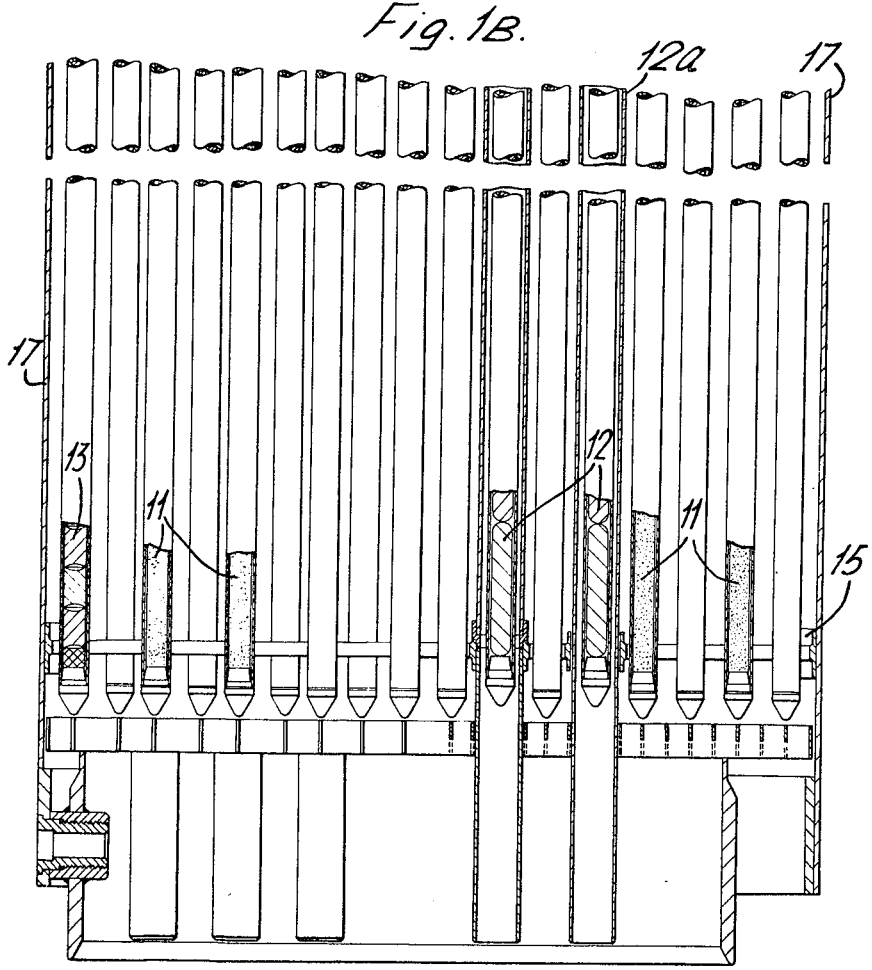
Figure 2:
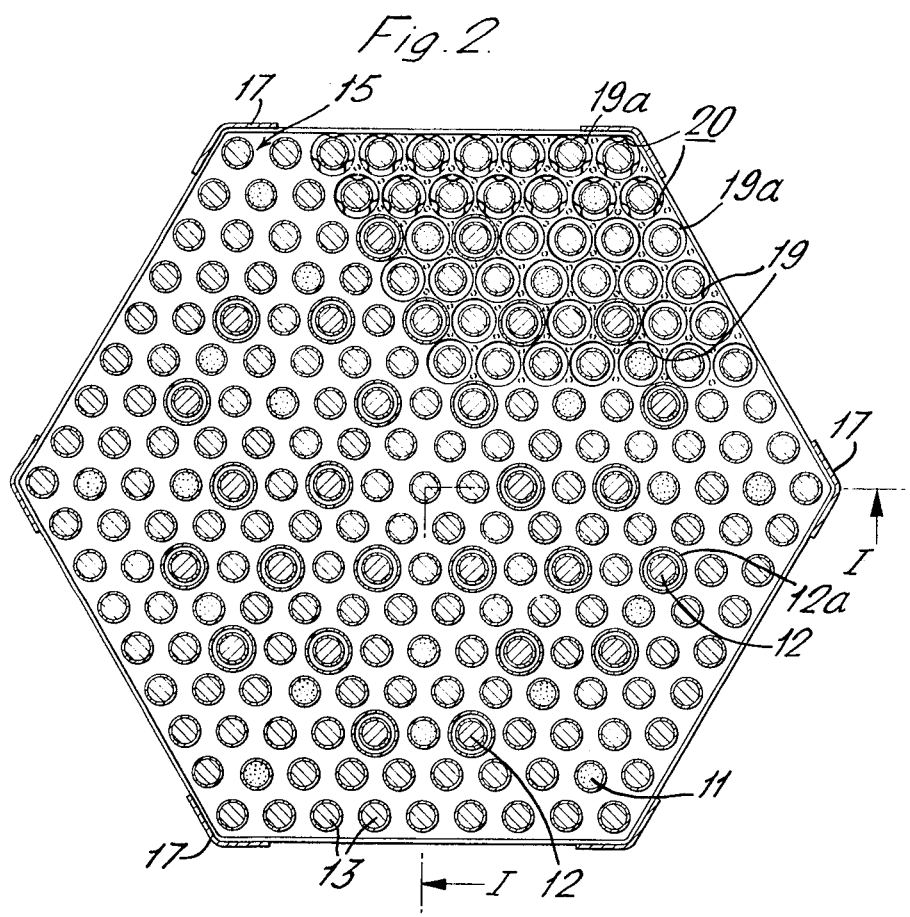
Figure 3:
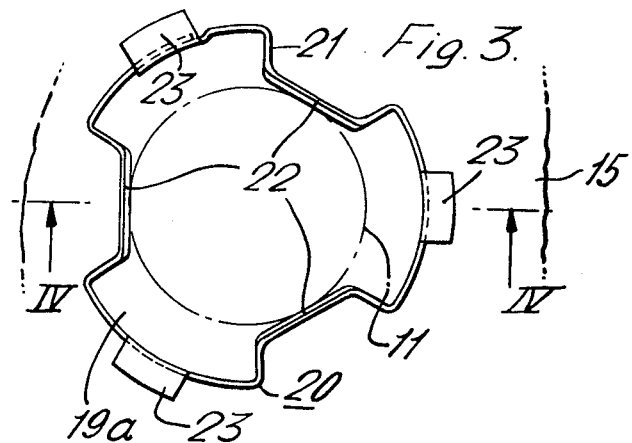
Figure 4:
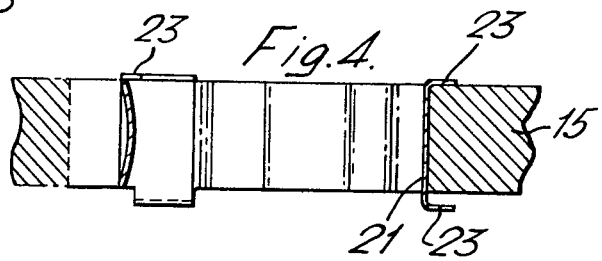
Figure 5:
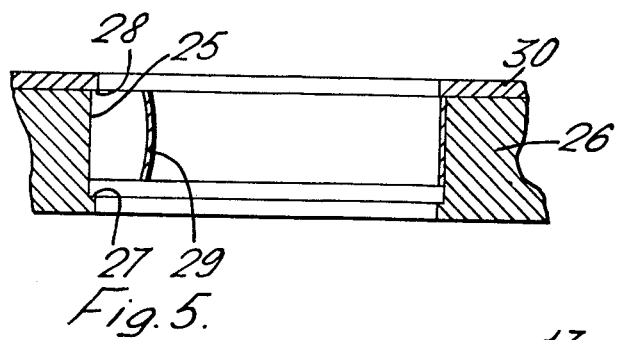
Figure 6:
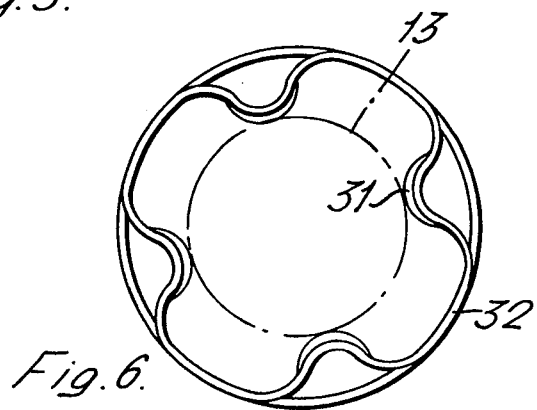

A nuclear reactor fuel element assembly embodying the invention and designed for a water cooled nuclear reactor will now be described, by way of example, with reference to the accompanying drawings in which:

FIGURE 1 is an axial section (in two consecutive parts A and B) along line I—I of FIGURE 2 through a nuclear reactor fuel assembly, FIGURE 2 is a cross section through the fuel assembly along line II—II of FIGURE 1, FIGURE 3 is an enlarged plan view of a detail of FIGURE 2 showing a spring insert in an aperture of FIGURE 2, FIGURE 4 is a cross section on line IV—IV of FIGURE 3, FIGURE 5 is a modification of the construction shown in FIGURES 3 and 4, and FIGURE 6 is another such modification.

In the hexagonal fuel assembly shown in FIGURES 1A, 1B and 2 there are twenty-one burnable poison pins 11 and twenty-seven control pins 12 interspersed in a generally regular manner between one hundred and sixty-nine fuel pins 13. The fuel pins 13 each comprise a spring loaded stack of ceramic (e.g. $UO_2$) nuclear fuel pellets within a metallic sheath. The various pins 11 to 13 are spaced apart centre to centre on a 0.72 inch triangular lattice and are 0.44 inch in diameter.

The burnable poison pins 11 and fuel pins 13 are suspended in spaced parallel array from a hexagonal upper support plate 14 and are located at ten and three quarter inch intervals along their length by a grid structure having five hexagonal spacer plates 15. These pins are fifty-eight inches overall with an active length of forty-seven inches. The control pins 12 each comprise a spring-loaded stack of slugs containing neutron-absorber material such as boron within a metallic sheath and are suspended from a control pin carrier 16 in an upper end fitting 16a; the control pins being movable with clearance in guide tubes 12a by way of the carrier 16 and an associated drive mechanism for the purpose of controlling the reactivity of a reactor core made up of a number of assemblies similar to the one shown.

A metallic support structure for locating the pins consists of the upper support plate 14 and the five spacer plates 15, the plates being located in spaced parallel array normal to the pins by angled corner strips 17 joined to the corners of the plates.

All the initially unperforated plates 14, 15 have 0.60 inch diameter holes drilled in them to allow passage of the control pin guide tubes 12a. The support plate 14 has holes 0.20 inch diameter drilled in it for passage of ends (of reduced size) of the other pins by which they are suspended, and has in addition further holes 18 for coolant flow, whereas apertures 19 drilled in the spacer plates 15 for passage with clearance of the fuel and poison pins 13, 11 are 0.70 inch diameter and the coolant flows upwardly in the radial clearance 19a between the pins 11, 13 and the walls bounding the apertures 19 in the spacer plates 15. The fuel and poison pins 13, 11 are located centrally in their respective apertures 19 by resilient inserts 20 captive in the apertures. It is to be noted that, for the sake of clarity, the apertures 19 and their inserts 20 are not specifically shown in FIGURES 1A and 1B and are shown in the upper right-hand portion of FIGURE 2 only, although they are in fact provided for each one of the pins 11, 13.

One form of such resilient insert 20 is shown in FIGURES 3 and 4. This comprises a strip 21 of spring steel material formed into a closed loop with three circumferentially equispaced re-entrant lobes 22; in axial cross section these lobes 22 are slightly barrelled where they contact the pin 11 to the extent of say 0.010 inch in a plate thickness of 0.20 inch. The insert 20 is rendered captive in the aperture by way of locating means in the form of three sets of tabs circumferentially equi-spaced around the insert between the lobes, each set comprising upper and lower bend over tabs 23 on the insert which do not however fold flat against the spacer plate 15 but allow some axial movement to reduce fretting of the inserts on the pins during thermal cycles. As shown in FIGURE 4 the upper tabs 23 of a set are folded flat against the upper surface of the spacer plate 15 whilst the lower tabs 23 are spaced from the lower surface of the spacer plate 15.

Another form of resilient insert is shown in FIGURE 5. This is substantially the same as that shown in FIGURES 3 and 4 with the omission of the bend over tabs. However, this is used in conjunction with a modified form of spacer plate which is provided with annular recesses 25 in the peripheral walls of the apertures; the inserts are captive in the apertures by virtue of the inserts engaging in the recesses. These recesses are conveniently formed by using a laminated construction for example that shown in FIGURE 5. The spacer plate is formed from two layers, a lower thicker one 26 having a stepped bore with an annular shoulder 27 at one end and an upper thinner one 30 perforated to provide an annular shoulder 28 for the other end of the stepped bore. The annular recess 25 is thus defined between the two annular shoulders 27, 28. The two layers 26, 30 are joined together to form a composite spacer plate by spot welding after the inserts 29 have been placed in the stepped bore. The inserts 29 again have axial clearance in the recesses 25.

FIGURE 6 is included in this description to show that more than three re-entrant lobes may be provided on each insert. FIGURE 6 shows four such lobes 31 on a resilient insert 32 made of metal tubing. The insert 32 may be rendered captive as described above with reference to FIGURES 3 and 4 or to FIGURE 5, and the lobes 31 are shown barrelled where they contact the pin 13 as with the lobes 22.

As can be readily seen from FIGURES 2 to 6, the form of the resilient inserts is such that they do not impede coolant flow over the pins through the clearances 19a to any significant extent.

The burnable poison pins 11 each comprise a spring-loaded column of e.g. zirconium boride-containing material within a metallic sheath. Some of the guide tubes 12a are of continuous form passing freely through the spacer plates 15 and having an upper end portion secured to the support plate 14 and to an upper plate of the fitting 16a (as with the right-hand tube 12a in FIGURES 1A and 1B) whilst others are formed in sections effectively joined to one another by way of the spacer plates 15 and having an upper end portion secured to the support plate 14 and to a lower plate of the fitting 16a (as with the left-hand tube 12a in FIGURES 1A and 1B), this arrangement serving to tie the plate 14 of the assembly to the fitting 16a housing the common carrier 16 for the movable control pins 12.

The grid structure of the invention offers more positive location of fuel (and burnable poison) pins than does the cellular grid referred to above, the spacer plate arrangement being in general terms more robust than the joined strips and/or wires without unduly increasing the pressure drop of coolant passing through it. The resilient inserts do not require any source of fluid pressure to maintain them in contact with the pins, they occupy only a very minor portion of the clearance between the pins and the bounding walls of the apertures through which the pins pass, and their barrelled form reduces the contact area between the inserts and the pins. The limited axial clearance between the captive resilient inserts and the spacer plate is provided so that during thermal cycling the pins and the inserts tend to move together relative to the spacer plate to reduce rubbing on the pins as compared with that occurring during relative movement between the pins and inserts.

We claim:

1. For a nuclear reactor fuel assembly containing a parallel array of fuel and poison pins, a grid structure comprising a spacer plate with oversize apertures for penetration by the pins, and resilient inserts each captive in a corresponding aperture and extending inwardly to provide at least three circumferentially spaced contacts for locating a pin centrally in the aperture with clearance between the pin and the bounding wall of the aperture to allow for flow of coolant over the pins.

2. A grid structure as claimed in claim 1, wherein each resilient insert is of tubular form and has at least three circumferentially equi-spaced lobes adapted to contact the fuel pins.

3. A grid structure as claimed in claim 1, wherein the inserts are held captive in the apertures by means allowing for limited axial movement of the inserts.

4. A grid structure as claimed in claim 3, wherein each of the inserts has locating means in the form of at least three sets of circumferentially equi-spaced tabs between the contacts, each set having upper and lower tabs adapted to locate the insert wth respect to the plate.

5. A grid structure according to claim 3, wherein the inserts are held captive in annular recesses in the bounding walls of the apertures.

6. A grid structure as claimed in claim 5, wherein the plate is of laminated form and the recesses are defined between shoulders on the laminations.

7. A grid structure as claimed in claim 2, wherein the lobes are barrelled.

8. A nuclear reactor fuel assembly comprising a plurality of fuel pins end supported in spaced array and penetrating intermediate their ends a grid structure according to claim 1.

9. A nuclear fuel assembly as claimed in claim 8, further comprising movable control pins interspaced between the fuel pins.

10. A nuclear reactor fuel assembly as claimed in claim 9, wherein the control pins are movable in guide tubes and are mounted from a common carrier.

11. A nuclear reactor fuel assembly as claimed in claim 10, wherein each pin comprises spring loaded material enclosed in a sheath.

References Cited

UNITED STATES PATENTS

| | | | |
|---|---|---|---|
| 3,070,527 | 12/1962 | Hurford et al. | 176—76 X |
| 3,281,327 | 10/1966 | Webb et al. | 176—76 |
| 3,298,922 | 1/1967 | Prince et al. | 176—76 X |
| 3,301,764 | 1/1967 | Timbs et al. | 176—76 X |
| 3,301,765 | 1/1967 | Eyre et al. | 176—76 X |

L. DEWAYNE RUTLEDGE, *Primary Examiner.*

CARL D. QUARFORTH, *Examiner.*

M. J. SCOLNICK, *Assistant Examiner.*